United States Patent [19]
Kemper

[11] 4,152,944
[45] May 8, 1979

[54] PISTON TYPE ENERGY CONVERSION MACHINE

[75] Inventor: Yves J. Kemper, Birmingham, Mich.

[73] Assignee: Vadetec Corporation, Troy, Mich.

[21] Appl. No.: 819,168

[22] Filed: Jul. 26, 1977

Related U.S. Application Data

[62] Division of Ser. No. 706,204, Jul. 9, 1976, abandoned.

[30] Foreign Application Priority Data

Jul. 12, 1976 [FR] France ............................. 76-21299

[51] Int. Cl.$^2$ ............... F16H 15/16; F16H 23/00; F16H 1/28; F02B 75/26
[52] U.S. Cl. ......................................... 74/191; 74/60; 74/800; 123/58 AA
[58] Field of Search ............... 74/190, 191, 199, 200, 74/196, 800, 60; 91/506; 123/58 AA

[56] References Cited

U.S. PATENT DOCUMENTS

| | | | |
|---|---|---|---|
| 1,139,50 | 5/1915 | Underwood | 74/60 |
| 773,206 | 10/1904 | Hall | 123/58 AA |
| 812,636 | 2/1906 | Callan | 74/60 |
| 3,130,684 | 4/1964 | Firth et al. | 91/506 |
| 3,221,564 | 12/1965 | Raymond | 74/60 X |

FOREIGN PATENT DOCUMENTS

2634244 2/1977 Fed. Rep. of Germany ............. 74/191
528820 12/1920 France ......................................... 74/191

Primary Examiner—Leonard H. Gerin
Attorney, Agent, or Firm—Robert F. Ziems

[57] ABSTRACT

A piston type energy conversion machine such as an internal combustion engine in which the thrust of piston reciprocation is converted to nutational movement of a tube-like member journalled in a support which is driven in rotation about a primary engine axis. Also supported for rotation on the primary engine axis is a biconical element to which torque is transmitted by friction from the nutating member. The pistons operate in a plane which undergoes a swashing movement on a point at the intersection of the primary axis with the axis of nutation. Also the connection of the pistons to the nutating member is by way of linkage including swivel links which function to absorb the thrust of each piston power stroke.

18 Claims, 5 Drawing Figures

PISTON TYPE ENERGY CONVERSION MACHINE

CROSS-REFERENCE TO RELATED APPLICATION

This application is a division of U.S. application Ser. No. 706,204, filed July 19, 1976, now abandoned.

BACKGROUND OF THE INVENTION

This invention concerns mechanical devices for transfering mechanical power between components with reciprocating motion and components with rotary motion.

U.S. Pat. application No. 706,291, filed July 19, 1976 and commonly owned with the present invention, discloses several embodiments of a variable speed transmission having a first element defining a pair of rolling surfaces of revolution about a first axis, a second element having a pair of rolling surfaces about a second axis intersecting the first at a point of axes intersection, a frame in which the first and second elements are supported to fix the angular orientation of the two axes, and a mechanical system for urging the respective rolling surfaces into frictional engagement with each other at two points of contact on opposite sides of the point of axes intersection. The rolling surfaces on one of the members are cone-like in shape whereas the rolling surfaces on the other element are ring-like and movable axially in opposite directions with respect to the point of axes intersection. The relative ratio of rolling surface radii at the points of contact may be made to vary to provide an infinitely variable speed ratio.

In one embodiment, the first element is provided with the cone-like rolling surfaces and is rotatable about the first axis at a velocity $\omega$. The second element carries the ring-like rolling surfaces and is journalled in a crank-like support such that the second axis may travel in a biconical path about the first axis at a velocity $\alpha$. The second element may or may not undergo rotation about the second axis at a velocity $\beta$. Also, the disclosure incorporates a mechanical linking system by which any two of the components rotating at velocities $\alpha$, $\beta$ and $\omega$ may be interconnected or in which all three of such velocity components may be connected by means of an epicycloidal train.

In the operation of one embodiment, the first element on which the cone-like rolling surfaces are provided is connected directly with an output shaft and thus rotatable at a velocity $\omega$. The second element is driven in nutational movement in which the second axis travels in a biconical path about the first axis at a velocity $\alpha$. The second element is prevented from rotating on the second axis ($\beta = 0$) by a mechanical linkage in the form of conical gears having an apex coincident with the point of axes intersection, one of which gears is fixed to the frame while the other is carried by the second element. Thus, the output shaft velocity $\omega$ will be related to input velocity $\alpha$ as a result of the ratio of radii at the two points of rolling friction contact between the rolling surfaces on the first and second elements.

In an alternative embodiment, the second element is driven at one end and connected also at one end by a linkage which prevents rotation of the second element on the second axis without impeding nutational movement of the second element. The preferred linkage is in the form of an annular diaphragm provided with concentric corrugations capable of flexing in a radial direction while being resistant to flexure in a circumferential direction. In addition, the two couples of rolling surfaces are generated by curves with radii comparable in magnitude and long compared with the average distance of each surface from its axis of revolution. Such radii are, for example, approximately twenty times the average distance. As a result of this latter feature, the distance of relative axial movement between the rolling surfaces to achieve speed ratio variation is shortened and overall efficiency is increased.

SUMMARY OF THE INVENTION

In accordance with the present invention, the transmissions disclosed in the aforementioned U.S. patent application are integrated with a piston machine such as an engine having at least one and preferably three or more reciprocating pistons for driving the nutatable member of such transmissions to provide an engine output torque. The nutatable member is connected with each piston by an arm-like extension fixed at one end to the member and pivotally connected to the respective pistons at fulcrum points lying in a common plane perpendicular to the axis of the nutatable member and passing through the point in which the axis of the nutatable member intersects the primary axis of the machine. An arrangement enabling transverse sliding movement of the pivotal connection of the arm-like extension to each piston accomodates an arc-like movement of the pivotally connected end of each arm as compared with a truly linear reciprocation of the piston. The thrust of each piston is balanced either by arranging the pistons to drive the nutating member at opposite ends or by swivel links fulcrumed at one end in the machine frame and at the other end at the juncture of each arm and the nutating member. In embodiments of the invention using the swivel links, symmetry of link movement with respect to the center of nutating member movement is maintained.

A primary object of the present invention is, therefore, to provide a piston machine wherein the speed of a rotary movement of a member associated with the piston reciprocation may vary independently of the frequency of piston reciprocation. Other objects include the provision of an engine in which one or more pistons are symmetrically integrated with a transmission providing a rotatable output torque, the provision of a balanced engine geometry and the like.

Other objects of the invention will be apparent from the following description of non-limiting examples with references to the attached drawings.

DETAILED DESCRIPTION OF THE PREFERRED EMBODIMENTS

In FIGS. 1-4, a heat engine is shown to include cylinders 24 in which pistons 22 are adapted to reciprocate in conventional fashion. The axes of the cylinders and pistons are located on a circle around a longitudinal or first axis 40. Thus, the pistons 22 undergo reciprocating motion on lines about parallel to the first axis 40. In other words, the longitudinal axes 43, 44 of the cylinders and pistons are about parallel to the first axis 40. In known manner, the pistons are powered by the expansion of thermal fluid ultimately exhausted through a system of valves activated by cams 33.

The body or frame 32 of the engine and transmission is integral with the cylinders 24. At the emplacement of the four cylinders of the heat engine, there is provided an annular chamber 23 in which each cylinder 24 is installed. A space is provided between the walls of the chambers and the outer walls of each cylinder so as to permit circulation of a cooling fluid. The four cylinders and four pistons of the engine are placed about the first axis 40 in two sub-assemblies of 2 cylinders; each of the two sub-assemblies are symmetrically placed in relation to the first axis 40 so that the cylinders of each sub-assembly are spaced at an angle of 45°. Thus the spacing between adjacent pistons of the respective sub-assemblies is 135°. Also, the heat engine may have more than four cylinders but preferably not less than three.

The output of the engine is transmitted as torque by a shaft 1 supported for rotation about the first axis 40 by a series of bearings 2 and 3 mounted at each end of the body 32. Rotatable with the shaft 1 as a "first element" of a transmission coupling the pistons with the shaft 1, are two rolling tracks 5a and 5b, which thus rotate on the axis 40, have a generally conical configuration and disposed symmetrically on opposite sides of a plane perpendicular to the axis 40 at a point of axes intersection S. The tracks 5a and 5b rotate directly with shaft 1 as a result of helicoidal ramps 4 which develop an axial force having a tendency to move both tracks 5a and 5b axially and symmetrically relative to the point S in a manner to be described in more detail below.

A supporting frame 10 is carried by the body 32 for rotation on the first axis 40 by way of two series of bearings 11 and 12. The frame 10 is hollow throughout its length to establish a cavity of cylindrical form concentric with a second axis 41 inclined at an angle a with respect to the axis 40. Also the second axis 41 intersects the first axis 40 at the point S. The hollow frame 10 surrounds the rolling tracks 5a and 5b rotatable as a unit with the shaft 1. Within the frame or support 10, a cylindrical second element 7 is rotatably supported about the axis 41 by two series of bearings 8 and 9. The cylindrical element 7 carries two rolling tracks 6a and 6b having surfaces of revolution about the axis 41 which approach a cylindrical configuration. The rolling tracks 6a and 6b are symmetrical in relation to a plane 42 perpendicular to the axis 41 of the point S. Also they are movable axially within the element 7 and rotate as a unit with the latter due to a system of cylindrical guides 13.

Axial movement of the rolling tracks 6a and 6b of the second element 7 is controlled by a hydraulic system in which actuating or control fluid is delivered by flexible tubing (not shown) to a fitting 14 at one end of a longitudinal channel 15 machined in the element 7. Thus, channel 15 communicates with two annular chambers 16 and 17 situated at the ends of the second element, one face of each being respectively constituted by a shoulder integral with the rolling tracks 6a and 6b. The entry of a pressurized fluid in the annular chambers causes the axial displacement of the rolling tracks 6a and 6b. The purpose of this displacement will be described in more detail below.

From the foregoing, it will be appreciated that the assembly of the support, or frame 10 and bearings 11, 12, 8 and 9 allows the second element 7 to nutate in a manner so that the axis 41 may travel in a biconical path about the axis 40 with the angle of inclination a constant.

Figure 1:
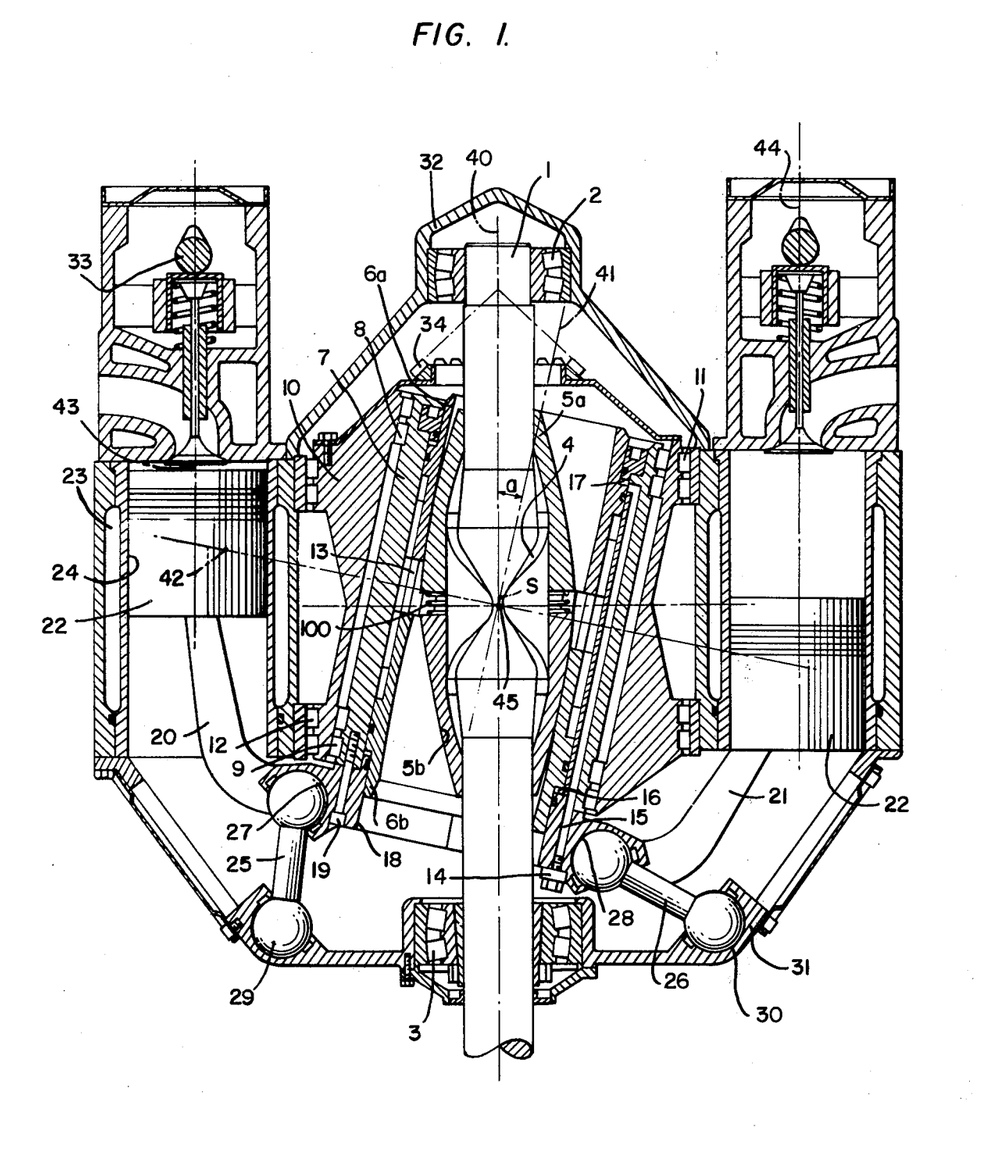
FIG. 1 is a longitudinal section of one embodiment of a heat engine incorporating the present invention.

Inturned or crank-like extensions 20, 21, equal to the number of pistons, are mounted integrally at one end with the second element 7. The other end of each extension is positioned in a radial plane 42 passing through the first axis. The extensions are articulated in relation to the pistons, at their other end. These articulations linking the pistons to the extensions are known devices and are of the type described in the publication (Science and Mechanics, May, 1964, p.12 (Hammond Action Engine by Bill Lequel and D. Lorschawn), or else of the cardan type as it will be described below with reference to FIG. 5. The centers of the articulations are located in the plane 42 perpendicular to the axis 41 at S. These articulations have herein above been designated as "liaison-means".

The extremities of the extension travel in a path relative to the axis 43, 44 of the cylinders, the projection of such such path in a transverse plane being a circle having a diameter D computed by the formula:

$$D = E(1 - \cos a)$$

In the formula, E represents the distance between the axis 43 of the cylinder and the first axis 40.

Because of this characteristic of motion at the ends of the extensions, it is desirable, if not necessary, to design the articulation with each piston so that the center of articulation can describe a circle around the axis of the piston. A preferred solution to this problem will be described below.

Links 25, 26 are provided to absorb the longitudinal component of the thrust exerted the reciprocating pistons. The links are articulated or swivelled both on part 31 of the body 32 and on element 7 by means of ball-and-socket joints 27, 29 and 30, 32, respectively. The joints 27, 28 are mounted on an annular collar 18 mounted on the second element by bolt 19.

Figure 3:
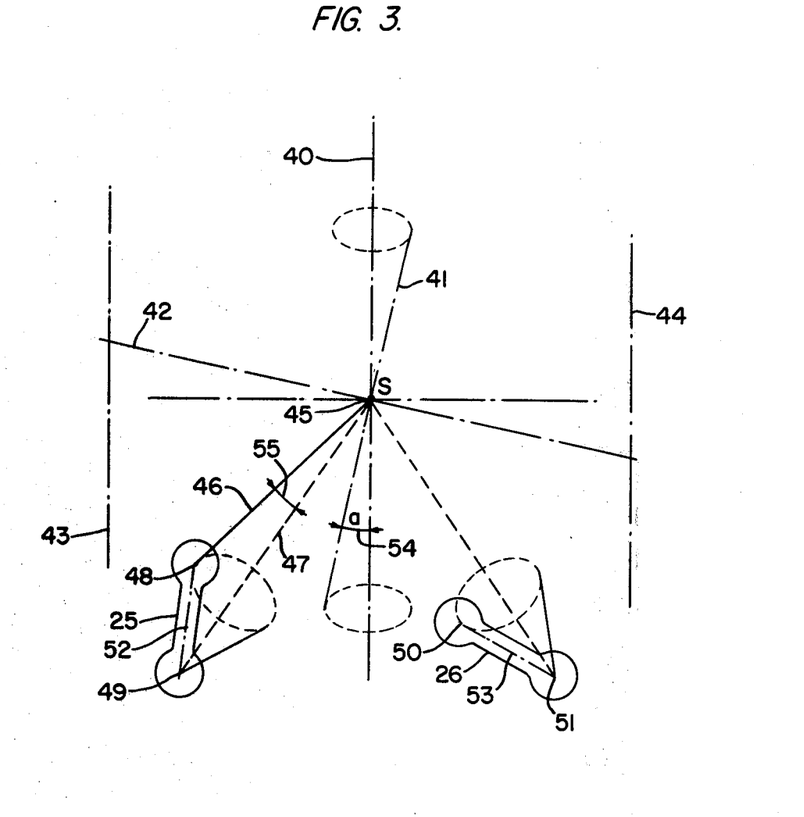
FIG. 3 is a schematic sketch depicting, for the embodiment shown in FIG. 1, the geometric relationship of linkage connecting reciprocating and rotating components.
Figure 4:
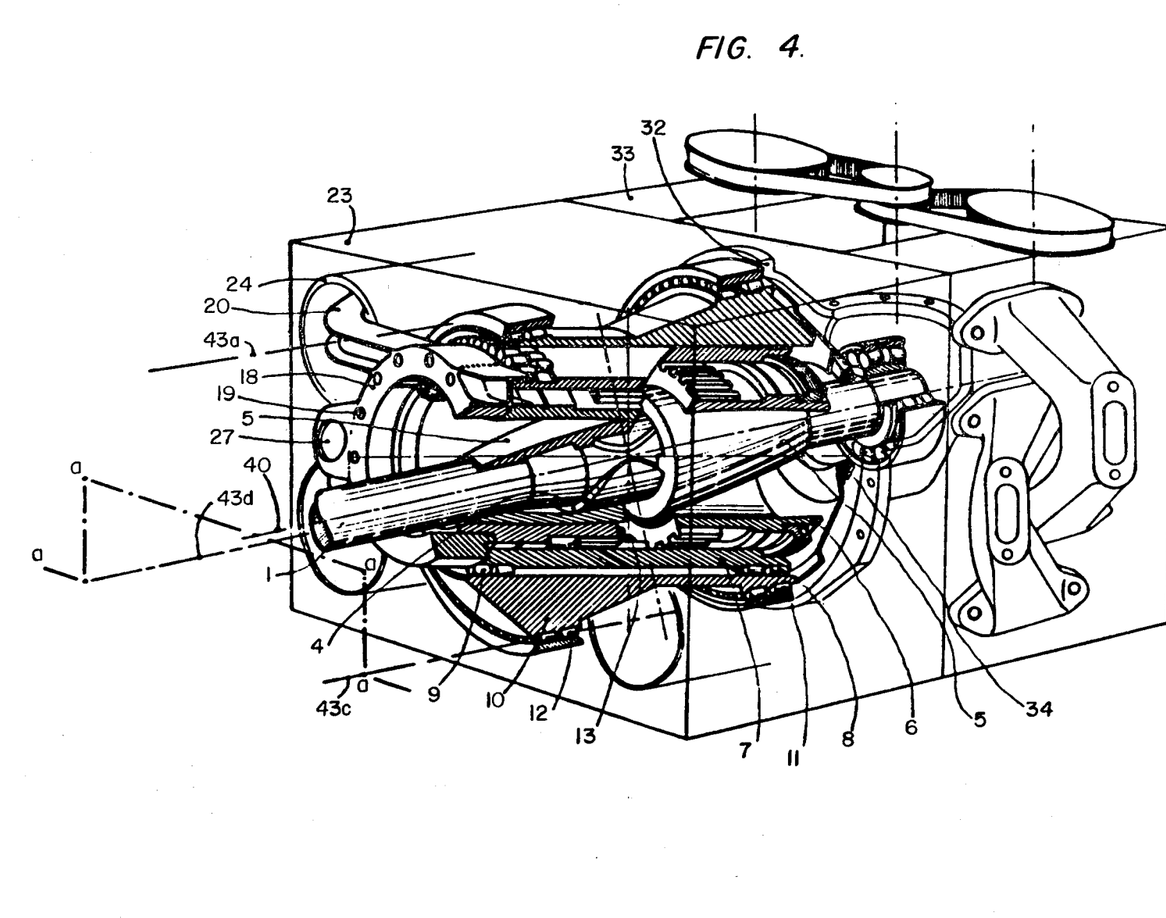
FIG. 4 is a cutaway view of the embodiment represented by FIG. 1.

In FIG. 3, relative the positions of the centers of the ball-and-socket joints as well as the length of the links as shown to facilitate an understanding of how the engine may be designed so as not to interfere with the nutational motion of the second element 7. FIG. 3 schematically shows the first axis 40, the center S of nutation 45, the second axis 41, the plane 42 perpendicular to the second axis 41 passing through S. The angle 54 is the angle of inclination a of the second axis in relation to the first axis.

Given the position of the centers 49 and 51 of the ball-and socket joints 29, 30, the position of the centers 48 and 50 of the ball-and-socket joints 27 and 28 as well as the lengths 52 and 53 and the links 25 and 26 can be calculated as follows:

Starting from line 47 joining the centers 45 and 49, an angle 55 is plotted equal to angle 54 and then, on side 46 of this angle, a line is drawn equal in length to the distance between the end of the second element and the center. The position of the center 48 of the ball-and-socket joint 27 is thus established. The length 52 of the link 25 is then given by the distance between the centers 48 and 49.

To complete the description of the engine, it will be noted that bevel gearing 34 rotates integrally with frame 10. The bevel gearing 34 rotates at the speed α or the orbital velocity of the second axis in relation to the first axis and is utilized for synchronizing the action of the auxilary mechanisms of the heat engine such as a camshaft, alternator, water pump, gas pump, etc. . .

In operation, the reciprocating motion of pistons 22 is transmitted, by the articulations between the piston and the extensions 20, to second element 7. Since this element can only nutate around the center S, due to the arrangement of the supporting frame 10, the second element 7 is caused to be driven by the piston 22 in a nutating motion around the center S.

The rolling tracks 6a and 6b rotate without slippage on the tracks 5a and 5b coupled rotatably with the shaft 1 and therefore drive the latter as well as the shaft 1 into rotation around the first axis 40.

The kinematic relations linking the nutational speed α of the second element around the first axis and the speed ω of shaft 1 are known relations which are described in the aforementioned Patent Application Ser. No. 706,291, filed July 19, 1976. In particular, $\omega = \alpha - R_b/R_w \alpha$ where $R_b$ is the effective radius of the tracks 6a and 6b, and where $R_w$ is the radius of the tracks 5a, 5b at the points of contact with the tracks 6a and 6b.

It will be noted that in this machine, the speed β of the second element about the second axis 41 is zero, because the extensions are linked to the pistons and the cylinders which are fixed in relation to the body. By contrast, the speed β* of the second element in a rotating plane passing through the second axis and the first axis is different from zero. By means of this kinematic chain, the reciprocating motion of the pistons is definitely transformed into the rotary motion of shaft 1.

The contact pressure between the rolling tracks 5 and 6 is obtained by the system of helicoidal ramps 4 on which the conical tracks 5a and 5b are threaded. It is a fact that the load to be set in motion induces a resistant or a reaction couple on the shaft 1. This couple opposing rotation of shaft 1 tends to produce an axial displacement of the tracks 5a and 5b when the latter, entrained by the tracks of the second element, tend to rotate around axis 40. This results in creating a pressure at the points of contact approximately proportional to the reaction couple induced by the load.

The mechanical system to produce the contact pressure is not the only one conceivable. It might be replaced by an elastic system having springs axially restraining the rolling tracks 5a and 5b or by a hydraulic system lodged between shaft 1 and the rolling tracks 5a and 5b. Such systems have been described in the aforementioned U.S. application.

The structure of the hydraulic system which permits axial displacement of the rolling tracks 6a and 6b of the second element has been described above. This system makes is possible to modify the speed ratio of engine speed or frequency of piston reciprocation and rotation of the shaft 1. Modification of the axial position of tracks 6a and 6b brings about correlatively, by the action of the ramps 4 (as described), an axial displacement of tracks 5a and 5b. This results in an axial variation of the points of contact between the rolling tracks 6a–5a and 6b–5b. Accordingly the function, $R_b/R_w$ is infinitely variable in the formula given above. The means utilized for axially shifting the rolling tracks of the second element are not the only ones possible. Other systems described in U.S. Application Ser. No. 706,291 are also conceivable.

A spring 100 is placed between the two conical tracks 5a, 5b; its function is to apply the tracks 5a, 5b against the rolling tracks 6a and 6b and to create a contact pressure sufficient to the action of the ramps.

It should be noted that the profile of the rolling tracks is, in this alternate solution, well adapted to induce large variations of the contact-point positions by a slight change in the axial position of the rolling tracks of the second element.

This particular profile of the rolling tracks is characterized by the fact that the radii of the meridian curve of the rolling surfaces are of the same order of magnitude and of an order of magnitude indicated in relation to the transverse dimensions of the trasmission. The radius of this curvature is about equal to 10 or 100 times the maximum transverse diameter of the rolling tracks of the second element.

Figure 2:
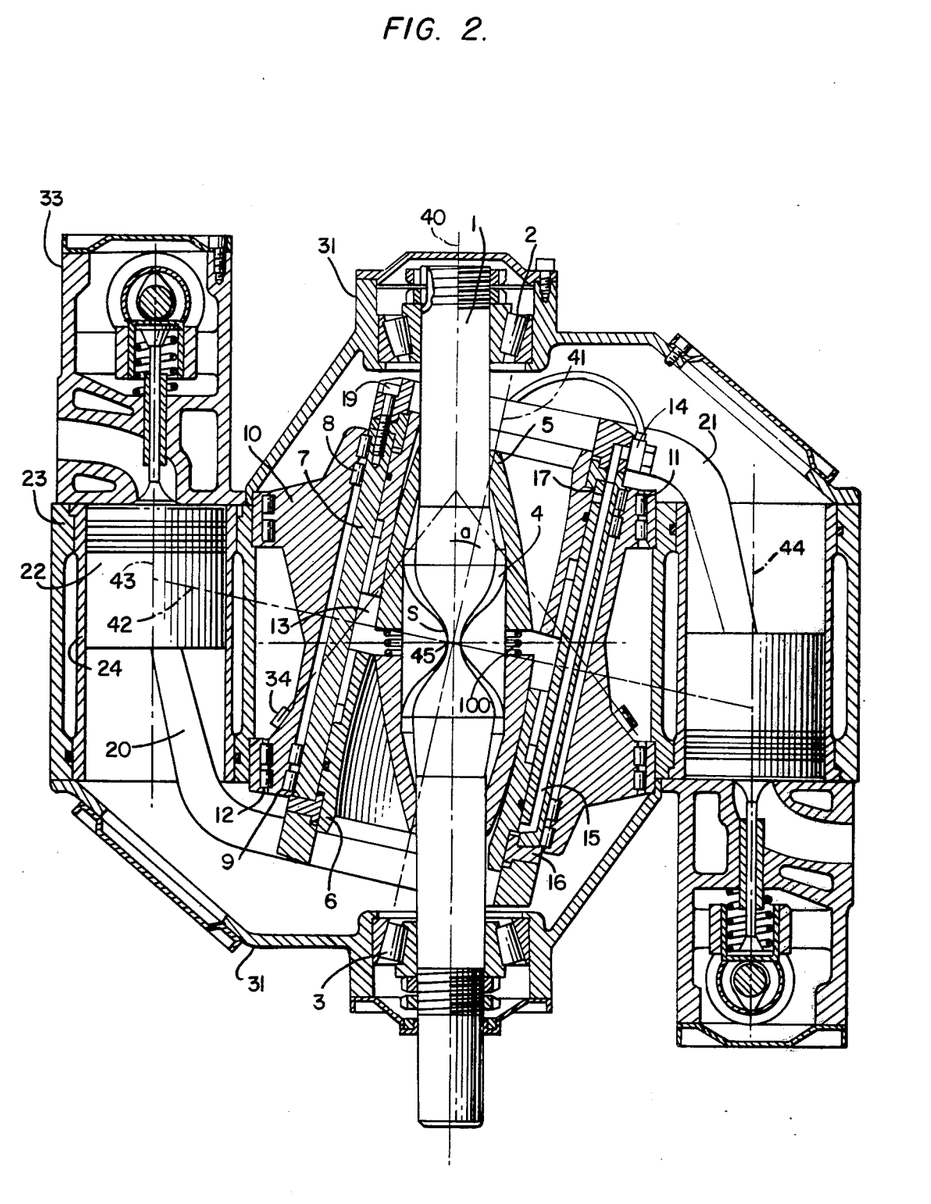
FIG. 2 is a longitudinal section of another embodiment in which engine pistons are connected respectively to one and the other end of a transmission.

In FIG. 2, an alternative embodiment is shown in which components common to the embodiment of FIG. 1 have the same reference numbers and any explanations previously made are valid in regard to them.

This alternate solution is distinctive from the preceding one in that two of the cylinders and pistons are located symmetrically in relation to point S. The incurved extensions 20 and 21 are therefore mounted one at one end of the second element and the other at the other end of the second element. This symmetrical position of the cylinders enforces synchronization of their thermal cycle. By contract, this head-to-foot position of the cylinders allows an automatic compensation of the axial component of the piston thrust. Consequently, it is no longer necessary in this solution to provide the system of links 25 and 26 described previously.

Otherwise, the functioning of this transmission is comparable, if not identical, to that of the first solution.

Figure 5:
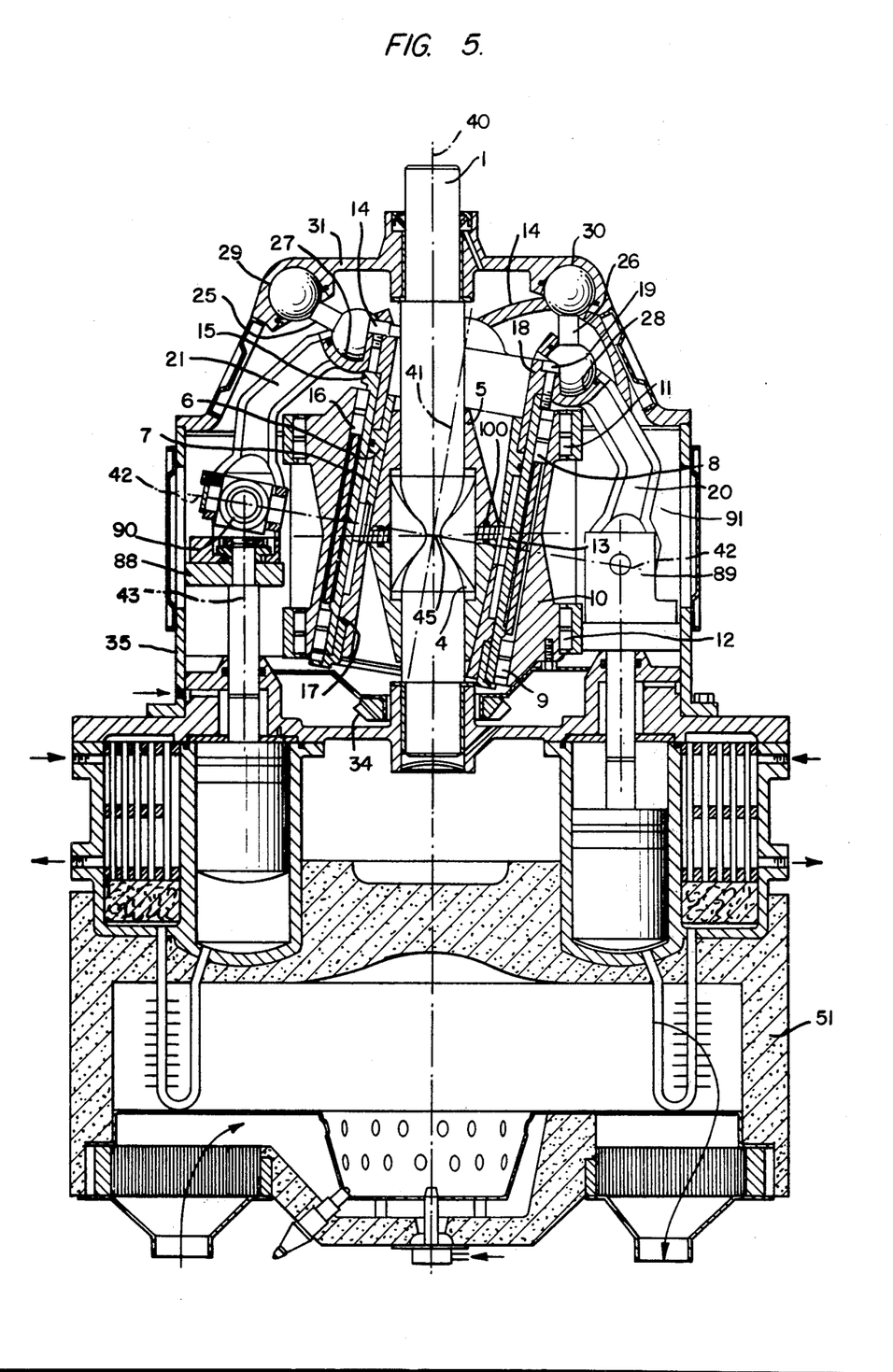
FIG. 5 is a longitudinal view of another embodiment of the invention.

FIG. 5 represents another embodiment, in which the thermal engine 51 is a Stirling engine. Also in FIG. 5, the majority of the components already described in referring to FIGS. 1, 2 and 3 of the present application are identified by the same numerical references.

In the case of this embodiment, the four cylinders and four extensions are placed radially at regular intervals (their angle of placement is 90°).

The universal joint which comprises the linking means between the concave extensions 20, 21 and the coupling means will be described in detail.

The coupling means move with a reciprocating movement including the piston cross-heads 89 at least in the cylinders. The piston cross-heads slide, according to the direction of the axis of the thermal motor cylinder, in the piston guides 91 of the cylindrical parts. The diameter of the piston cross-heads is slightly less in diameter than the piston guides; this difference of diameter is equal to D and is expressed in the formula:

$$D = E(1 - \cos a)$$

explained above. Each piston cross-head is mounted on the end of a piston rod, which is an integral part of the piston of the thermal motor. It is mounted in such a way that it can move freely in a transverse plane while being bound with the piston and in an axial direction. It is fixed with the piston rod by the intermediary of a piston ring bound tightly by a screw nut against the ring of the guidance system 88 in the guide 91 at the end of the piston rod. A universal joint is mounted on each piston cross-head where one of the parts is integrated with the end of extension 21. The center of the universal joint is located in the plane 42. Because of the ability of the piston cross-head to be laterally positioned, it can follow the arcuate movement of the end of extension 21 all the while being able to rest against the cylinder guide 91. The result is that the second element is blocked in rotation by its relation to the body ($\beta=0$; $\beta^* =\alpha$).

This invention has been illustrated in detail by two solutions for construction of a heat engine. It is obvious that the present invention covers other machinery having reciprocating motion. Specifically, shaft 1 may be a motor shaft and the pistons 22 may be those of a compressor.

With the invention now having been explained and its advantages justified through detailed examples, the petitioner reserves his exclusive rights to and in the invention for the entire duration of the patent without any limitation other than those of the terms of the claims attached hereto.

I claim:

1. An energy conversion machine comprising a frame, a torque transmitting member supported by said frame for rotation about a first axis, means including a piston to define a working fluid chamber on said frame, said piston being reciprocable on a second axis, transmission means drivably interconnecting said piston and said torque transmitting member and including a nutatable member having interior rolling surfaces of revolution about a third axis intersecting said first axis at an angle to establish a point of axes intersection, said third axis being revolvable in a biconical path about said first axis, said torque transmitting member having exterior rolling surfaces of revolution about said first axis and in rolling frictional engagement with said interior rolling surfaces at two points of contact on opposite sides of said point of axes intersection, an arm-like extension having one end connected to said nutatable member and another end connected pivotally at a fulcrum point to said piston, said fulcrum point lying in a plane perpendicular to said third axis and passing through said point of axes intersection.

2. The machine recited in claim 1 wherein said arm-like extension is rigidly connected at said one end to said nutatable member.

3. The machine recited in claim 2 including liaison means coupling the other end of said arm-like extension to said piston, said liaison means permitting said fulcrum point to move in an arcuate path during linear movement of said piston.

4. The machine recited in claim 1 wherein said arm-like extension is connected to one end of said nutatable member and including a swivel link pivoted at opposite ends at said one end of said nutatable member and said frame, respectively, said end of said swivel link pivoted in said nutatable member being movable in a path concentric with a line extending from the opposite end of said swivel link to said point of axes intersection.

5. The machine recited in claim 1 including at least three of said pistons and a corresponding number of said arm-like extensions.

6. The machine recited in claim 5 wherein said extensions are symmetrically connected at opposite ends of said nutatable member.

7. The machine recited in claim 5 wherein said extensions are connected at the same end of said nutatable member.

8. The machine recited in claim 7 including swivel means for compensating the longitudinal component of thrust exerted by said pistons.

9. The machine recited in claim 8 wherein said swivel means comprises for each piston a swivel link pivoted at opposite ends in said nutatable member and said frame, respectively, said end of said swivel link pivoted in said nutatable member being movable in a path concentric with a line extending from the opposite end of said swivel link to said point of axes intersection.

10. The machine recited in claim 1 wherein the center of gravity of said nutatable member is coincident with said point of axes intersection.

11. The machine recited in claim 1 including means to introduce expansible fluid into said working chamber to drive said pistons through a power stroke and wherein said torque transmitting member is the output of an engine.

12. The machine recited in claim 11 wherein said working fluid chamber is the combustion chamber of an internal combustion engine.

13. The machine recited in claim 11 including means for operating said working fluid chamber in accordance with a Stirling cycle.

14. The machine recited in claim 1 wherein the radius ratio of said interior and exterior rolling surfaces is variable at said points of contact thereby to enable the speed of said torque transmitting member to be varied with respect to the speed of third axis revolution in said biconical path.

15. The machine recited in claim 14 wherein said exterior rolling surfaces of revolution are oppositely converging cone-like surfaces and wherein said interior rolling surfaces are provided on axially adjustable ring-like members.

16. The machine recited in claim 14 including means to advance said cone-like rolling surfaces axially against said interior rolling surfaces.

17. The machine recited in claim 16 wherein the generatrices of said rolling surfaces are curves.

18. An energy conversion machine comprising a frame, a torque transmitting member supported by said frame for rotation about a first axis, means including a piston to define a working fluid chamber on said frame, said piston being reciprocable on a second axis, transmission means drivably interconnecting said piston and said torque transmitting member and including a nutatable member having a third axis intersecting said first axis at an angle to establish a point of axes intersection, said third axis being revolvable about said first axis, an arm-like extension having one end connected to one end of said nutatable member and another end connected pivotally at a fulcrum point to said piston, and a swivel link pivoted at opposite ends at said one end of said nutatable member and said frame, respectively, the end of said swivel link pivoted in said nutatable member being movable in a path concentric with a line extending from the opposite end of said swivel link to said point of axes intersection.

* * * * *

UNITED STATES PATENT AND TRADEMARK OFFICE
CERTIFICATE OF CORRECTION

PATENT NO. : 4,152,944
DATED : May 8, 1979
INVENTOR(S) : Yves J. Kemper

It is certified that error appears in the above-identified patent and that said Letters Patent are hereby corrected as shown below:

On the face of the patent, under the title "Related U.S. Application Data" the filing date of Ser. No. 706,204 should read --July 19, 1976--.

Column 6, line 19, "trasmission" should read --transmission--.

Signed and Sealed this

Twenty-fifth Day of September 1979

[SEAL]

Attest:

Attesting Officer

LUTRELLE F. PARKER
*Acting Commissioner of Patents and Trademarks*